United States Patent
Meissner et al.

(10) Patent No.: US 9,533,273 B2
(45) Date of Patent: Jan. 3, 2017

(54) SYSTEMS AND METHODS FOR ISOLATING A PARTICULATE PRODUCT WHEN RECYCLING LEAD FROM SPENT LEAD-ACID BATTERIES

(71) Applicant: Johnson Controls Technology Company, Holland, MI (US)

(72) Inventors: Eberhard Meissner, Wunstorf (DE); Matthew A. Spence, Lindenhurst, IL (US); Patrick M. Curran, Laguna Niguel, CA (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 14/498,839

(22) Filed: Sep. 26, 2014

(65) Prior Publication Data
US 2015/0368749 A1 Dec. 24, 2015

Related U.S. Application Data

(60) Provisional application No. 62/015,045, filed on Jun. 20, 2014, provisional application No. 62/015,042, (Continued)

(51) Int. Cl.
*C22B 13/00* (2006.01)
*B01J 8/00* (2006.01)
(Continued)

(52) U.S. Cl.
CPC .............. *B01J 8/008* (2013.01); *B01J 6/001* (2013.01); *B01J 6/002* (2013.01); *C22B 3/02* (2013.01);
(Continued)

(58) Field of Classification Search
CPC ............ C22B 3/04; C22B 7/006; C22B 7/007; B01J 6/001; B01J 6/002; B01J 8/008; H01M 6/52
(Continued)

(56) References Cited

U.S. PATENT DOCUMENTS 4,118,219 A 10/1978 Elmore et al.
4,220,628 A 9/1980 Kolakowski
(Continued)

FOREIGN PATENT DOCUMENTS

CA 2141906 A1 4/1996
CA 2319285 A1 3/2002
(Continued)

OTHER PUBLICATIONS

Zhu, Xinfeng; Leaching of Spent Lead Acid Battery Paste Components by Sodium Citrate and Acetic Acid; Journal of Hazardous Materials, Feb. 19, 2013; pp. 387-396.
(Continued)

*Primary Examiner* — Steven Bos
(74) *Attorney, Agent, or Firm* — Fletcher Yoder, P.C.

(57) ABSTRACT

The present disclosure relates to systems and methods by which lead from spent lead-acid batteries may be extracted, purified, and used in the construction of new lead-acid batteries. A method includes forming a first mixture in a first vessel, wherein the first mixture includes a lead-bearing material and a carboxylate source, which react to precipitate lead salt particles. The method includes separating a portion of the first mixture from a remainder of the first mixture, wherein the portion includes lead salt particles having specific densities below a specific density threshold value and/or having particle sizes below a particle size threshold value. The method includes forming a second mixture in a second vessel, wherein the second mixture includes the lead
(Continued)

salt particles from the separated portion of the first mixture. The method further includes separating the lead salt particles of the second mixture from a liquid component of the second mixture.

29 Claims, 3 Drawing Sheets

Related U.S. Application Data filed on Jun. 20, 2014, provisional application No. 62/015,058, filed on Jun. 20, 2014, provisional application No. 62/015,070, filed on Jun. 20, 2014.

(51) Int. Cl.

| | | |
|---|---|---|
| B01J 6/00 | (2006.01) | |
| C22B 3/00 | (2006.01) | |
| C22B 7/00 | (2006.01) | |
| C22B 3/02 | (2006.01) | |
| C22B 3/04 | (2006.01) | |
| H01M 6/52 | (2006.01) | |
| H01M 10/54 | (2006.01) | |

(52) U.S. Cl.
CPC ............... *C22B 3/04* (2013.01); *C22B 7/006* (2013.01); *C22B 7/007* (2013.01); *C22B 13/04* (2013.01); *C22B 13/045* (2013.01); *H01M 6/52* (2013.01); *H01M 10/54* (2013.01); *B01J 2208/00805* (2013.01); *Y02P 10/234* (2015.11); *Y02W 30/84* (2015.05)

(58) Field of Classification Search
USPC .......................... 209/3, 12.1; 429/49; 423/92
See application file for complete search history.

(56) References Cited

U.S. PATENT DOCUMENTS

| | | | |
|---|---|---|---|
| 4,269,811 A | 5/1981 | Striffler, Jr. | |
| 4,336,236 A | 6/1982 | Kolakowski et al. | |
| 5,292,456 A | 3/1994 | Francis et al. | |
| 5,342,449 A | 8/1994 | Holbein et al. | |
| 5,429,661 A | 7/1995 | Khodov et al. | |
| 5,460,730 A | 10/1995 | Czerny et al. | |
| 5,514,263 A | 5/1996 | Spijkerman et al. | |
| 5,630,931 A | 5/1997 | Manequini | |
| 5,690,718 A | 11/1997 | Sabin | |
| 5,827,347 A | 10/1998 | Margulis | |
| 5,840,262 A | 11/1998 | Margulis | |
| 5,879,830 A | 3/1999 | Olper et al. | |
| 5,944,869 A | 8/1999 | Modica et al. | |
| 6,110,433 A | 8/2000 | Kleinsorgen et al. | |
| 6,150,050 A | 11/2000 | Mathew et al. | |
| 6,471,743 B1 | 10/2002 | Young et al. | |
| 7,090,760 B2 | 8/2006 | Seo et al. | |
| 7,498,012 B2 | 3/2009 | Olper et al. | |
| 7,507,496 B1 | 3/2009 | Kinsbursky et al. | |
| 7,608,178 B2 | 10/2009 | De Jonghe et al. | |
| 7,713,502 B2 | 5/2010 | Koehler et al. | |
| 7,772,452 B2 | 8/2010 | Modica | |
| 7,799,294 B2 | 9/2010 | Kordosky et al. | |
| 7,833,646 B2 | 11/2010 | Zenger et al. | |
| 8,147,780 B2 | 4/2012 | Martini | |
| 8,323,376 B2 | 12/2012 | Kumar et al. | |
| 8,562,923 B1 | 10/2013 | Smith et al. | |
| 2006/0239903 A1 | 10/2006 | Guerriero et al. | |
| 2007/0028720 A1 | 2/2007 | Sommariva et al. | |
| 2010/0040938 A1* | 2/2010 | Kumar | C22B 3/165 429/49 |
| 2010/0043600 A1 | 2/2010 | Martini | |
| 2010/0143219 A1 | 6/2010 | Chow | |
| 2011/0129410 A1 | 6/2011 | Trindade | |
| 2012/0186397 A1 | 7/2012 | Martini | |
| 2013/0064743 A1 | 3/2013 | Laurin et al. | |

FOREIGN PATENT DOCUMENTS

| | | |
|---|---|---|
| CN | 1357938 | 7/2002 |
| CN | 1451771 | 10/2003 |
| CN | 1470675 | 1/2004 |
| CN | 1601805 | 3/2005 |
| CN | 1812183 | 8/2006 |
| CN | 101104887 | 1/2008 |
| CN | 101104890 | 1/2008 |
| CN | 101205080 | 6/2008 |
| CN | 201071389 | 6/2008 |
| CN | 101250720 | 8/2008 |
| CN | 101291008 | 10/2008 |
| CN | 101318692 | 12/2008 |
| CN | 101345328 | 1/2009 |
| CN | 101414698 | 4/2009 |
| CN | 101488597 | 7/2009 |
| CN | 101514395 | 8/2009 |
| CN | 101540395 | 9/2009 |
| CN | 101608264 | 12/2009 |
| CN | 101613803 | 12/2009 |
| CN | 101615707 | 12/2009 |
| CN | 101748277 | 6/2010 |
| CN | 101759158 | 6/2010 |
| CN | 101771181 | 7/2010 |
| CN | 101792176 | 8/2010 |
| CN | 101831668 | 9/2010 |
| CN | 101899576 | 12/2010 |
| CN | 101994007 | 3/2011 |
| CN | 102020374 | 4/2011 |
| CN | 102020375 | 4/2011 |
| CN | 102031380 | 4/2011 |
| CN | 102162034 | 8/2011 |
| CN | 102306855 | 1/2012 |
| CN | 102306856 | 1/2012 |
| CN | 102351217 | 2/2012 |
| CN | 102396099 | 3/2012 |
| CN | 102427149 | 4/2012 |
| CN | 202285265 | 6/2012 |
| CN | 102560122 | 7/2012 |
| CN | 102560535 | 7/2012 |
| CN | 103050745 | 4/2013 |
| DE | 69905134 T2 | 10/2003 |
| EP | 0905810 A2 | 3/1999 |
| EP | 1656463 A1 | 5/2006 |
| EP | 1684369 A1 | 7/2006 |
| EP | 1728764 A1 | 12/2006 |
| EP | 2182569 A1 | 5/2010 |
| EP | 2312686 A1 | 4/2011 |
| EP | 2333895 A1 | 6/2011 |
| EP | 2450991 A1 | 5/2012 |
| EP | 2604711 A1 | 6/2013 |
| JP | H10162868 | 6/1998 |
| RU | 2298044 C2 | 4/2007 |
| RU | 2302059 C1 | 6/2007 |
| TW | 391986 | 6/2000 |
| TW | 200937702 | 9/2009 |
| WO | WO0121846 A1 | 3/2001 |
| WO | WO03025235 A1 | 3/2003 |
| WO | WO2005007904 A1 | 1/2005 |
| WO | WO2008047956 A1 | 4/2008 |
| WO | 2008056125 A1 | 5/2008 |
| WO | 2008087684 A1 | 7/2008 |
| WO | WO2011138996 A1 | 11/2011 |

OTHER PUBLICATIONS

International Search Report and Written Opinion for PCT Application No. PCT/US2015/034758 mailed Dec. 23, 2015.
International Search Report and Written Opinion for PCT Application No. PCT/US2015/034694 mailed Dec. 23, 2015.
International Search Report and Written Opinion for PCT Application No. PCT/US2015/034761 mailed Dec. 23, 2015.

(56) References Cited

OTHER PUBLICATIONS

International Search Report and Written Opinion for PCT Application No. PCT/US2015/034717 mailed Dec. 23, 2015.
PCT International Search Report and Written Opinion for Application No. PCT/US2015/035257 mailed on Sep. 2, 2015.

* cited by examiner

SYSTEMS AND METHODS FOR ISOLATING A PARTICULATE PRODUCT WHEN RECYCLING LEAD FROM SPENT LEAD-ACID BATTERIES

CROSS-REFERENCE

This application claims priority from and the benefit of U.S. Provisional Application Ser. No. 62/015,045, entitled "METHODS FOR PURIFYING AND RECYCLING LEAD FROM SPENT LEAD-ACID BATTERIES", filed Jun. 20, 2014, U.S. Provisional Application Ser. No. 62/015,042, entitled "SYSTEMS AND METHODS FOR PURIFYING AND RECYCLING LEAD FROM SPENT LEAD-ACID BATTERIES", filed Jun. 20, 2014, U.S. Provisional Application Ser. No. 62/015,058, entitled "SYSTEMS AND METHODS FOR CLOSED-LOOP RECYCLING OF A LIQUID COMPONENT OF A LEACHING MIXTURE WHEN RECYCLING LEAD FROM SPENT LEAD-ACID BATTERIES", filed Jun. 20, 2014, U.S. Provisional Application Ser. No. 62/015,070, entitled "SYSTEMS AND METHODS FOR SEPARATING A PARTICULATE PRODUCT FROM PARTICULATE WASTE WHEN RECYCLING LEAD FROM SPENT LEAD-ACID BATTERIES", filed Jun. 20, 2014, which are hereby incorporated by reference for all purposes.

BACKGROUND

The present disclosure relates generally to systems and methods for recycling lead-acid batteries, and more specifically, relates to purifying and recycling the lead content from lead-acid batteries.

The lead present in a lead-acid battery may be in a number of forms. For example, a lead-acid battery may include grids that contain lead alloys and lead oxide ($PbO$, $PbO_2$), battery paste that contains metallic lead sponge, lead oxide, red lead, and/or lead sulfate, and posts and/or interconnects that contain metallic lead, lead alloys, and which may also contain non-lead alloys. While it may be desirable to attempt to recover lead from spent or retired lead-acid batteries, this material may include a variety of lead compounds (lead alloys, oxides, sulfates and carbonates) and an array of physical and/or chemical impurities. Existing methods for purifying lead typically rely almost entirely on multi-stage pyrometallurgical smelting in which some these compounds are combusted to produce volatile gases, some of which must be scrubbed (e.g., captured and removed from the exhaust stream) to prevent release, in accordance with environmental regulations, and subsequently the remaining impurities are removed from the metallic lead in various refining operations. Since these operations often require specialized equipment and certain consumables (e.g., solutions or other refining agents), this refinement process generally adds cost and complexity to the lead recovery process.

SUMMARY

The present disclosure relates to systems and methods by which lead from spent lead-acid batteries may be extracted, purified, and used in the construction of new lead-acid batteries. In an embodiment, a system includes a leaching vessel that receives and mixes a lead-bearing material and a carboxylate source to form a leaching mixture yielding lead salt particles as a product. The system includes a first separation device coupled to the leaching vessel, wherein the first separation device separates a substantial portion of the lead salt particles from the leaching mixture. The lead salt particles have specific densities below a specific density threshold value, particle sizes below a particle size threshold value, or both. The system includes a growth vessel coupled to the first separation device, wherein the growth vessel receives the lead salt particles from the first separation device and forms a growth mixture from the lead salt particles. The system further includes a second separation device coupled to the growth vessel, wherein the second separation device isolates the lead salt particles from a liquid component of the growth mixture.

In another embodiment, a method includes forming a first mixture in a first vessel, wherein the first mixture includes a lead-bearing material and a carboxylate source, which react to precipitate lead salt particles. The method includes separating a portion of the first mixture from a remainder of the first mixture, wherein the portion includes lead salt particles having specific densities below a specific density threshold value and/or having particle sizes below a particle size threshold value. The method includes forming a second mixture in a second vessel, wherein the second mixture includes the lead salt particles from the separated portion of the first mixture. The method further includes separating the lead salt particles of the second mixture from a liquid component of the second mixture.

In another embodiment, a system includes a leaching vessel that contains a leaching mixture including a lead-bearing material, a carboxylate source, and lead salt particles. The leaching vessel includes a stirring device that continually or intermittently stirs the leaching mixture to separate the leaching mixture in the leaching vessel into an upper portion and a lower portion, wherein the upper portion substantially includes the lead salt particles having specific densities below a specific density threshold value and/or having particle sizes below a particle size threshold value. The leaching vessel further includes a first orifice through which the upper portion of the leaching mixture exits the leaching vessel to reach a growth vessel.

DRAWINGS

DETAILED DESCRIPTION

Figure 1:
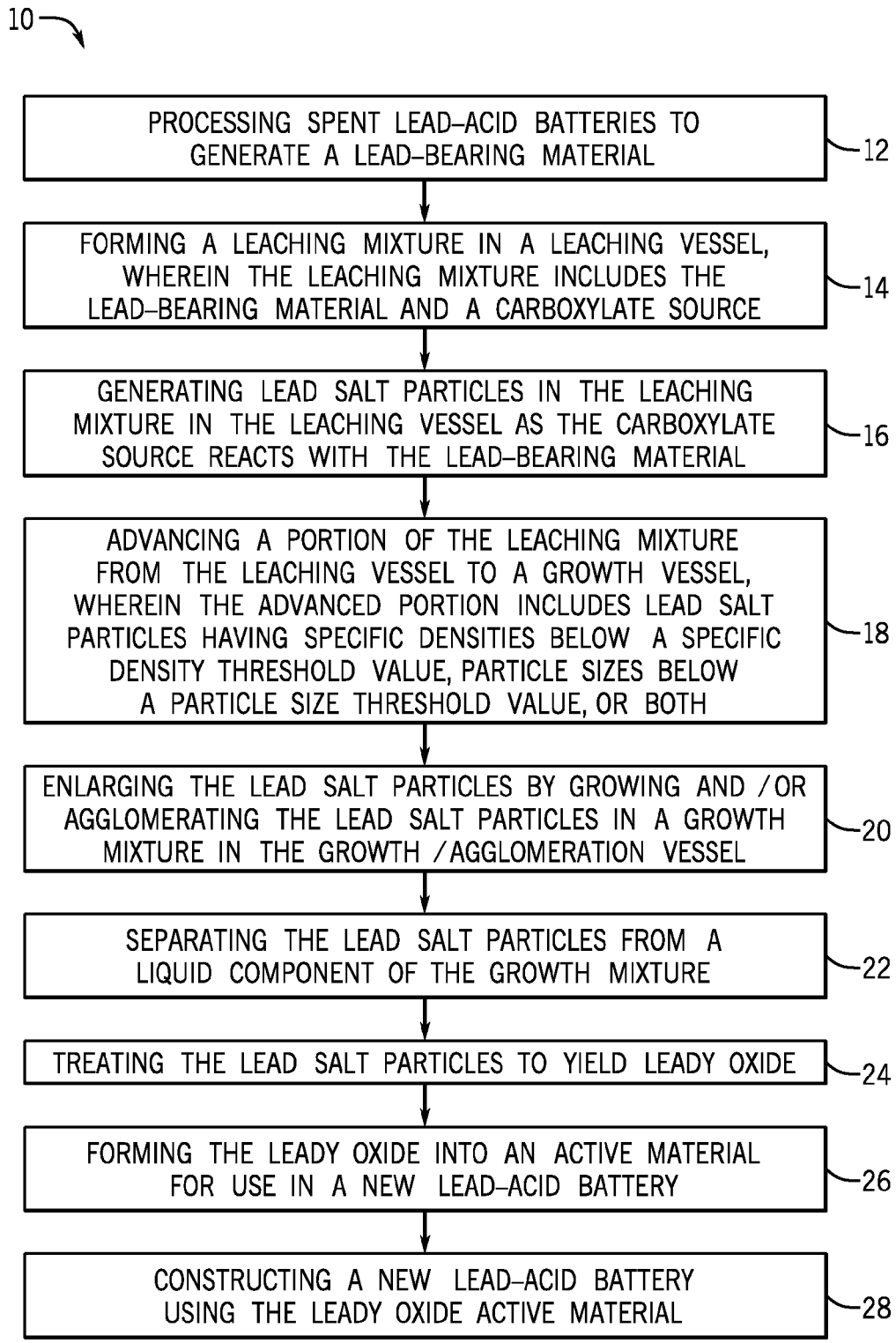
FIG. 1 is a flow diagram illustrating an embodiment of a process by which lead from spent lead-acid batteries may be extracted, purified, and used in the construction of a new lead-acid battery.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, the disclosure of a particular component being made of or including a particular element called out by name (e.g., lead), should be interpreted to encompass all forms of lead (e.g., metallic lead, lead compounds, or mixtures thereof). For distinction, as used herein, the disclosure of a metallic form of an element may be indicated by the chemical formula (e.g., Pb(0)) or using the terms elemental, metallic, or free (e.g., elemental lead, metallic lead, or free lead). As used herein, "leady oxide" may be used to indicate a mixture of metallic lead (e.g., Pb(0)) and lead oxide (e.g., PbO) in various ratios from approximately 0% to approximately 35% in metallic lead. As used herein, the term "substantially free" may be used to indicate that the identified component is not present at all, or is only present in a trace amount (e.g., less than 0.1%, less than 0.01%, or less than 0.001%). As used herein, a "carboxylate source" is any molecule or polymer that includes at least one carboxylate or carboxylic acid or moiety or functionality. Accordingly, a non-limited list of example carboxylate sources include: citric acid, acetic acid, formic acid, citrate, acetate, formate, dilactate, oxalate, tartarate, or any combination thereof. The term "citrate" herein refers to citric acid, or a citrate salt of a Group 1 or Group 2 metal, or ammonium citrate. The term "acetate" herein refers to acetic acid, or acetate salts of a Group 1 or Group 2 metal, or ammonium acetate. "New lead-acid battery" herein refers to a newly produced lead acid battery, while the term "spent lead-acid battery," also referred to as a battery core, indicates a battery at the end of its useable service life. As used herein "peroxide" refers to hydrogen peroxide and/or any organic peroxide (e.g., peracetic acid). The term "hydroxide" herein indicates a Group 1 or Group 2 metal hydroxide, ammonium hydroxide, or ammonia gas introduced into the reaction mixture to form ammonium hydroxide in-situ, or combinations thereof.

As mentioned above, existing methods typically rely heavily on pyrometallurgical smelting or combustion to recover and purify lead from spent lead-acid batteries. For such methods, the lead-bearing material from spent lead-acid batteries, which may include a number of lead compounds and a number of impurities, may be heated such that at least a portion of the impurities may combust or volatilize and be released as byproducts. Additionally, after pyrometallurgical smelting or combustion of the lead-bearing material, such methods may involve subsequent refinement steps to remove byproducts or other impurities to yield purified lead. Since the atmospheric release of some of these combustion byproducts (e.g., $SO_2$, soot) may be restricted by local environmental regulations, present embodiments are directed toward enabling a solution-based removal of several impurities from the recovered lead, thereby avoiding or reducing the formation of such combustion byproducts and/or the cost associated with scrubbing them from the exhaust stream. Additionally, present embodiments address limitations of other lead purification techniques, enabling a robust technique for purifying and recycling of recovered lead on an industrial scale. Moreover, as discussed in detail below, present embodiments enable the selective advancement of lead salt (e.g., lead citrate, lead acetate) precipitate particles from a leaching vessel (e.g., a reactor or tank) to a growth/agglomeration vessel (e.g., a different reactor or tank) prior to isolation. As discussed below, the less dense lead salt particles are generally separated from the denser lead-bearing material particulates based on specific density and/or particle size, limiting or reducing the amount of impurities entrained in the lead salt particles that are eventually isolated and formed into leady oxide. Further, advancing the lead salt particles to a separate growth/agglomeration vessel enables improved control over growth and agglomeration conditions (e.g., temperature, agitation, pH) separately from the conditions of the leaching mixture in the leaching vessel, and may provide enlarged lead salt particles that are more easily and/or more efficiently isolated from the liquid component in the growth/agglomeration vessel. Accordingly, present embodiments enable a lead recovery and purification technique that is robust to the presence of a wide variety of impurities, improves efficiency, improves purity of the leady oxide product, and limits or reduces the release of undesirable byproducts.

FIG. 1 is a flow diagram illustrating an embodiment of a process 10 by which lead from spent lead-acid batteries may be extracted, purified, and used in the construction of new lead-acid batteries. It may be appreciated that the process 10 of FIG. 1 is merely provided as an example and, in other embodiments, the process 10 may include additional purification steps (e.g., additional hydrometallurgical purification steps, additional phase-, size- or density-based separation steps, additional pH adjustment steps) in accordance with the present disclosure. As illustrated in FIG. 1, the process 10 begins with the processing (block 12) of spent lead-acid batteries to generate a lead-bearing material. For example, in an embodiment, one or more lead-acid batteries may be fed through a hammer mill or another suitable device that is capable of crushing, pulverizing, grinding or otherwise physically digesting the entirety of the spent lead-acid battery. The components of the spent lead-acid battery may include, for example, metal posts, metal connectors, metal grids, carbon black, glass, a plastic or metal casing, plastic separators, plastic fibers, lignosulphonates or other organic expanders, battery paste (e.g., including various lead oxides, lead carbonates, lead sulfates), sulfuric acid, among other components (e.g., non-lead-based metal components, such as, brass terminals). As mentioned above, the lead present in the spent lead acid battery may be present in a number of different chemical forms, including, for example, lead oxides, lead sulfates, lead carbonates and metallic lead.

After being substantially pulverized, the resulting processed battery matter may, in certain embodiments, be passed through one or more preliminary purification steps in which certain components (e.g., the crushed plastic components) may be removed from the remainder of the lead-bearing material, for example, using a separation device (e.g., a settling tank or cyclone separator) that takes advantage of the lower density of these plastic components. For example, in certain embodiments, sieving may be applied as a separation step to separate undesired fractions (e.g., massive metal particle fractions of the processed battery matter) from the desired lead-bearing material. Further, in certain embodiments, some, or all, of the residual sulfuric acid entrained in the lead-bearing material may be recycled for reuse, or neutralized and crystallized as a solid sulfate for disposal or resale. In certain embodiments, pre-treatment of the lead-bearing material may include a full or partial desulfurization stage in which the sulfate content of the lead-bearing material may be reduced by chemical means, for example, by treatment with a hydroxide (e.g., sodium hydroxide) or carbonate (e.g., soda ash). Each of these actions or steps may be generally represented by block 12.

The illustrated method 10 continues with forming (block 14) a leaching mixture in a leaching vessel (e.g., leaching reactor or tank) that includes the lead-bearing material generated in block 12 (e.g., all of the lead-bearing material, or a separated fraction thereof, as discussed above) and a carboxylate source. In particular, the leaching mixture may be an aqueous slurry that includes insoluble lead-bearing material particulates and a carboxylate source. In certain embodiments, the carboxylate source may be metal citrate (e.g., sodium citrate), citric acid, metal acetate (e.g., sodium acetate), acetic acid, a combination thereof, or any other suitable carboxylate source that may drive the formation of lead salts in the leaching mixture. In certain embodiments, water, and/or a peroxide may be added to the leaching mixture as well to encourage the dissolution of solid lead-bearing material and the formation of lead salts in the leaching mixture. In certain embodiments, the leaching mixture may include a combination of a peroxide, a hydroxide, and sodium carbonate. In certain embodiments, sodium hydroxide or sodium carbonate may be added to the leaching mixture, or sodium citrate may be used as at least a portion of the carboxylate source, to encourage the formation of sodium sulfate from lead sulfate that may be present in the leaching mixture. In certain embodiments, block 14 may be performed at low (acidic) pH (e.g., pH between 1 and 7) and at slightly elevated temperatures (e.g., approximately 30-100° C.). Within the leaching mixture, the carboxylate source reacts with one or more forms of lead in the leaching mixture (e.g., metallic lead, lead sulfate, lead carbonate, and lead oxide), with or without the assistance of a peroxide that may be present in the leaching mixture, to yield a lead salt (e.g., lead citrate, lead acetate). Since the lead salt may have limited solubility under the conditions present in the leaching vessel (e.g., at low pH levels), a lead salt precipitate is generated (block 16) in the leaching mixture as a result.

It may be appreciated that, at this point in the illustrated process 10, the leaching mixture in the leaching vessel may include small lead salt precipitate particles, soluble and insoluble lead compounds (e.g., lead-bearing material), and/or other processed battery matter from the spent and digested lead-acid batteries. Accordingly, a portion of the first mixture, including the lead salt precipitate particles, may be advanced (block 18) from the leaching vessel to a growth vessel (e.g., a growth reactor or tank) based on specific density and/or particle size. More specifically, the portion of the leaching mixture advanced to the growth vessel includes mostly or entirely lead salt particles that either have a lower specific density than a specific density threshold value, a size (e.g., a diameter) that is below a particle size threshold value, or a combination thereof.

For example, in certain embodiments, the advanced portion of the leaching mixture (i.e., the portion of the first mixture advanced from the leaching vessel to the growth vessel) includes solid lead salt particles having specific densities that are less than approximately 6 grams per milliliter (g/mL), less than approximately 5.5 g/mL, less than approximately 5 g/mL, less than approximately 4.5 g/mL, less than approximately 4 g/mL, less than approximately 3.5 g/mL, or less than approximately 3 g/mL. Further, in certain embodiments, the advanced portion of the leaching mixture may include substantially processed battery matter particulates having a specific density greater than approximately 3 g/mL, greater than approximately 3.5 g/mL, greater than approximately 4 g/mL, greater than approximately 4.5 g/mL, greater than approximately 5 g/mL, greater than approximately 5.5 g/mL, or greater than approximately 6 g/mL. Furthermore, in certain embodiments, since the lead salt particles may be substantially smaller in size than the insoluble lead-bearing particulates, the advanced portion of the leaching mixture may, additionally or alternatively, only include particles having a size (e.g., a diameter or a radius) below a particles size threshold value, and this particles size threshold value may range between approximately 1 μm and approximately 20 μm. For example, in certain embodiments, the advanced portion of the leaching mixture may, additionally or alternatively, only include particles of the leaching mixture that have a size less than 20 μm, less than 10 μm, less than 5 μm, less than 2 μm, or less than 1 μm. As discussed below, the portion of the leaching mixture having particles with a sufficiently low specific density and/or sufficiently small particle size may be selectively removed from the leaching vessel, leaving the higher specific density and/or larger lead-bearing material particles behind to resume leaching. In certain embodiments, the higher specific density and/or larger lead-bearing material particles may be separately removed from the leaching vessel, in either a continual or intermittent fashion, and may proceed to other purification techniques in accordance with the present disclosure.

Additionally, in certain embodiments, the specific density threshold value may be further tuned to enable enhanced control of the lead salt particles that are removed from the leaching vessel and transferred to the growth vessel. For example, different forms of lead salts (e.g., monovalent, divalent, trivalent lead citrate) that may be present within the leaching mixture may each have a different specific density, which may enable the selective advancement of particular lead salt species to the growth vessel. By specific example, in certain embodiments, the specific density threshold value may be low (e.g., approximately 2 g/mL to approximately 2.5 g/mL, which generally include lead salt particles that are relatively high in organic content and lower in lead content), and the portion of the leaching mixture having particles with specific densities below this value may be selectively transferred to the growth vessel. In other embodiments, the specific density threshold value may be higher (e.g., approximately 4 g/mL to approximately 4.5 g/mL) enabling a larger portion of the particles in leaching mixture to be transferred to the growth vessel. In still other embodiments, the specific density threshold value may be even higher (e.g., approximately 5 g/mL to approximately 6 g/mL) and may be selected to be below the specific densities the lead-bearing material particles (e.g., particles of lead sulfate, lead oxide, lead alloy) to limit or prevent their advancement to the growth vessel along with the lead salt precipitate. As mentioned above, the particle size threshold value may, additionally or alternatively, be tuned to exclude or block the lead-bearing material particles from advancing to the growth vessel. It may be appreciated that, in certain embodiments, the separation of lead salt precipitate and lead-bearing particulates may not be exact, and a small portion of the lead salt precipitate may not advance to the growth vessel, and/or a small portion of material other than lead salt precipitate may advance to the growth vessel, without negating the effectiveness of the present approach.

Accordingly, the portion of the leaching mixture advanced to the growth vessel may generally include a substantial portion (e.g., most or all of the) lead salt precipitate particles and a portion of the liquid component of the leaching mixture. Accordingly, the process 10 continues with the enlarging (block 20) of the received lead salt precipitate particles by growing and/or agglomerating the particles in a growth mixture in the growth vessel. In certain embodiments, the growth mixture may include only the lead salt precipitate particles and a portion of the liquid component of the leaching mixture advanced from the leaching vessel. In other embodiments, lead salt seed crystals may be added to the growth mixture to encourage the growth and/or agglomeration of the received lead salt precipitate particles. In certain embodiments, acid (e.g., citric acid, acetic acid) or base (e.g., sodium carbonate, sodium hydroxide) may be added to the growth mixture in the growth vessel to encourage the growth and/or agglomeration of the received lead salt precipitate particles. In certain embodiments, the growth mixture may include a combination of seed crystals, acid, and base. Additionally, in certain embodiments, the growth vessel may be cooled and agitated to facilitate growth and/or agglomeration of the lead salt particles in the growth mixture. As such, it may be appreciated that, in certain embodiments, the conditions (e.g., temperature, agitation, pH) within the growth vessel may be substantially different from the conditions within the leaching vessel. For example, by using separate leaching and growth vessels, as presently disclosed, the conditions (e.g., higher temperatures, rapid agitation, higher pH) within the leaching vessel may be configured to primarily encourage leaching of the lead-bearing material and lead salt formation, while the conditions (e.g., lower temperatures, gentle agitation, lower pH) within the growth vessel may be configured to primarily encourage growth of the lead salt particles. However, it may be appreciated that, in certain embodiments, the lead salt particles may not substantially grow or agglomerate within the growth vessel or growth mixture without negating the effectiveness of the present approach.

Subsequently, the lead salt particles may be separated (block 22) from the liquid component of the growth mixture. For example, in certain embodiments, the growth mixture may be supplied to a filter press that may separate the lead salt particles from the liquid component of the growth mixture. As discussed below, in certain embodiments, the lead salt particles may be separated from the liquid component using a dryer belt or a spray dryer. In other embodiments, the lead salt particles may be selectively removed from the growth vessel based on size, mass, or specific density, (e.g., using a cyclone separation device or a centrifuge separation device) such that the smaller lead salt particles remain in the growth vessel to continue growth and/or agglomeration. The isolated lead salt precipitate may be washed with water and the liquid component (and wash water) may subsequently retain all or most of the remaining impurities. For example, in certain embodiments, the isolated lead salt precipitate may include little or no residual sulfates (e.g., sodium sulfate and/or lead sulfate), such as less than 5% sulfates, less than 4% sulfates, less than 3% sulfates, less than 2% sulfates, less than 1% sulfates, less than 0.5% sulfates, less than 0.3% sulfates, or less than 0.1% sulfates. Further, in certain embodiments, the separated liquid component (and wash water) may be subsequently directed to other purification techniques, and potentially recycled within the lead recovery and purification process 10, in accordance with the present disclosure.

Next in the illustrated process 10, the lead salt precipitate may be treated (block 24) to yield leady oxide. For example, in certain embodiments, the treatment of block 24 may involve treating the isolated lead salt precipitate with base (e.g., hydroxide, 25-50 wt % sodium hydroxide solution) to yield the leady oxide product. In certain embodiments, the treatment of block 24 may involve a calcination treatment performed using a belt-dryer, a spray calciner, a stirred pot reactor, a rotary kiln, or another suitable calciner or kiln. For embodiments utilizing a calcination treatment, the lead salt precipitate may be heated to a temperature less than 450° C. (e.g., between approximately 275° C. and approximately 400° C., at approximately 330° C.). In certain embodiments, this heating may occur in the presence of a gas stream (e.g., air, oxygen-enriched air, oxygen-reduced air, air/inert gas mixtures, water steam) such that the carboxylate source combusts, resulting in a mixture of free lead (i.e., Pb(0)) and lead oxide (i.e., PbO), generally referred to as leady oxide. Since the carboxylate source structure includes a substantial amount of oxygen, in certain embodiments calcination may occur while combusting an oxygen reducer (e.g. methane, coke, propane, natural gas, etc.) to limit the amount of oxygen present during the calcination process to control the chemistry of the leady oxide product. For such embodiments, examples of process characteristics or variables that may affect the resulting leady oxide include the temperature of the calcination, time, droplet size (e.g., for spray calcination), lead salt particle size, how much residual water remains in the lead salt, the rate at which the lead salt is heated to the calcination temperature, and/or oxygen content in the gas stream.

The illustrated process 10 continues with the leady oxide produced from the treatment of block 24 being formed (block 26) into a leady oxide active material for use in a new lead-acid battery. For example, the leady oxide may be mixed with water and sulfuric acid to form a battery paste that may be applied to a plurality of lead grids to serve as the active material of a new lead-acid battery. Accordingly, a new lead-acid battery may be constructed (block 28) using the leady oxide battery paste formed in block 26. The leady oxide active material formed by the present approach may enable the production of new lead-acid batteries having good to excellent electrical performance. The leady oxide formed in block 24 may also be used to manufacture tribasic lead sulfate (3BS), tetra basic lead sulfate (4BS), and red lead (lead (II,IV) oxide, $Pb_3O_4$). In the case of 3BS and 4BS, the materials may be produced by mixing the leady oxide formed in block 24 with water and sulfuric acid using a mixer. In the case of red lead, the material may be formed by further treating (e.g., calcining and/or oxidizing) the leady oxide formed in block 24. All of these lead-based materials are useful in the construction of new lead-acid batteries, or for other suitable technical purposes.

Figure 2:
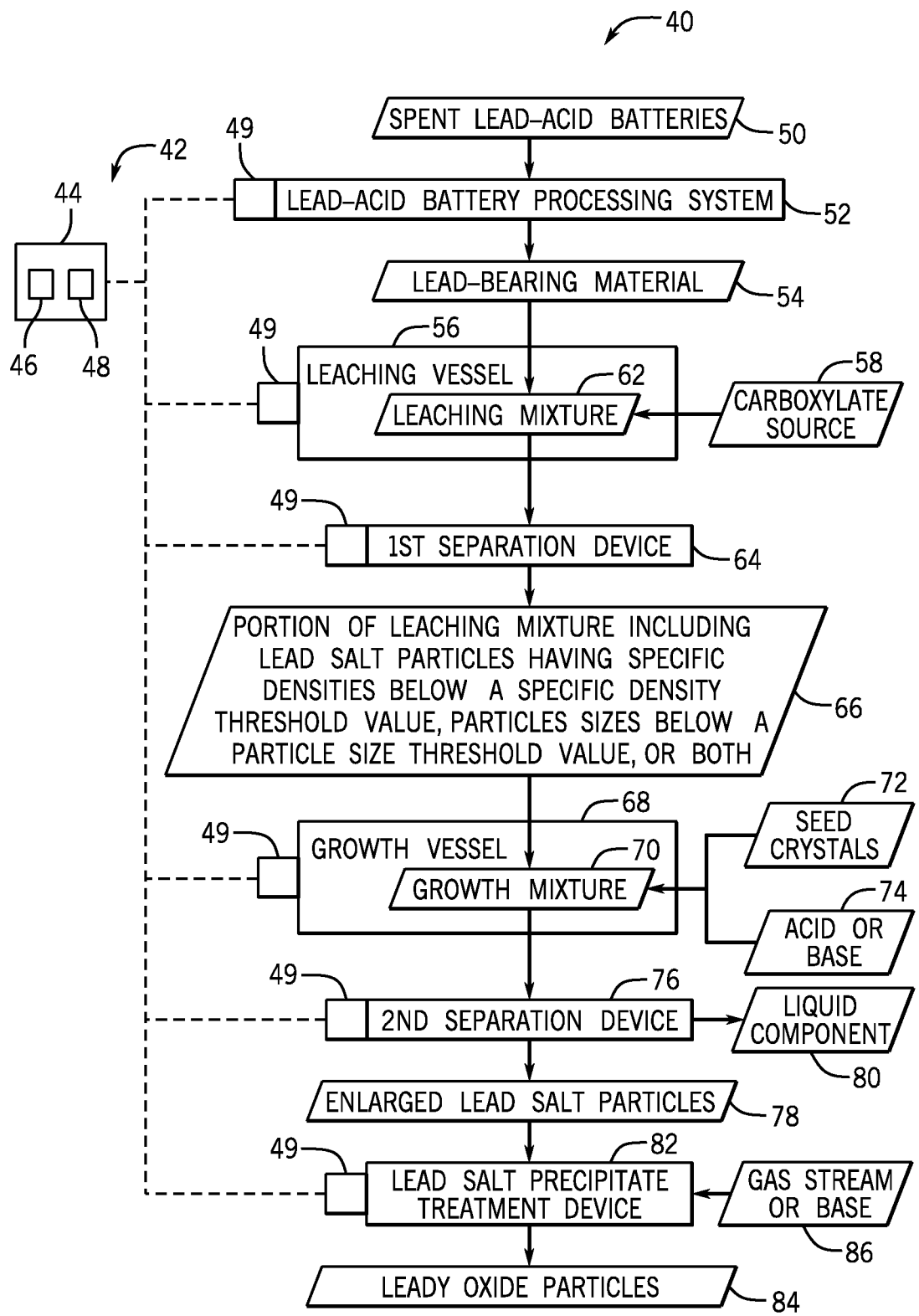
FIG. 2 is a schematic of an embodiment of a system for performing the process of FIG. 1.

FIG. 2 illustrates an embodiment of a system 40 configured to perform the process illustrated in FIG. 1 in what may be referred to as a continuous manner. In certain embodiments, some or all of the illustrated system 40 may be implemented as a multi-stage reactor system, or a series of individual reactors and devices, to enable the continuous processing of spent lead-acid batteries into leady oxide particles. In addition to these devices, stages, and/or reactors (illustrated as rectangles) in the system 40, FIG. 2 also illustrates various contents, inputs, and outputs (illustrated as non-rectangular parallelograms) for the devices of the system 40. The illustrated system 40 of FIG. 2 has a control system 42 that includes a controller 44 (e.g., an automation controller, such as a programmable logic controller (PLC)).

The controller 44 includes a memory 46 and a processor 48, which enable the controller 44 to store and execute instructions (e.g., applications, modules, apps, firmware) to control operation of the system 40 to control operation of the system 40 via field devices 49. For examples, field devices 49 may include any number of sensing devices (e.g., temperature sensors, pressure sensors, flow rate sensors, oxygen sensors, particle size sensors, rotational speed sensors, pH sensors) that are disposed throughout the system 40 and are communicatively coupled to the controller 44 (e.g., via a wired or wireless communication channel) to enable the controller 44 to determine the operational parameters of the system 40. Further, the field devices 49 may include any number of control devices (e.g., actuators, valves, motors, pumps, screws, heating elements, compressors) configured to receive control signals from the controller 44 and modulate the operation or state of the system 40 accordingly.

With the foregoing in mind, the illustrated system 40 includes a lead-acid battery processing system 52 that receives spent lead-acid batteries 50 and generates a lead-bearing material 54. As such, the lead-acid battery processing system 52 performs the acts described by block 12 of the process 10 illustrated in FIG. 1. As mentioned above, this lead-acid battery processing system 52 may include a hammer mill or another suitable device that is capable of receiving entire lead-acid batteries (e.g., via a feed chute) and grinding the lead-acid batteries into particulate or processed battery matter. Additionally, as mentioned above, the lead-acid battery processing system 52 may include some preliminary purification features to remove one or more components from the processed battery matter. For example, in certain embodiments, the lead-acid battery processing system 52 may include a cyclone separation device that receives the processed battery matter exiting the hammer mill, and may separate lower density processed battery matter (e.g., plastic particulates from the housing of the lead-acid batteries) from the higher density lead-bearing material 54 (e.g., metal particulates, battery paste), which may subsequently be advanced to the next device (e.g., leaching vessel 56) in the illustrated system 40. Also, as mentioned above, sieving may be applied to separate massive metal particle fractions from other portions of the processed battery matter.

The system 40 illustrated in FIG. 2 includes a leaching vessel 56 that is configured to perform the acts described in blocks 14 and 16 of the process 10 illustrated in FIG. 1. The leaching vessel 56 may be a reactor or a stage of a multi-stage reactor (e.g., a leaching tank or reactor) that receives the lead-bearing material 54 from the lead-acid battery processing system 52 and adds a carboxylate source 58 (e.g., citric acid, sodium citrate, acetic acid, sodium acetate, or a combination thereof) to form a leaching mixture 62. In certain embodiments, the lead salt precipitation device 56 may also add water, a peroxide, a hydroxide, and/or sodium carbonate, to the leaching mixture 62 to drive the formation of lead salt from the lead-bearing material. In certain embodiments, the leaching vessel 56 may also be capable of both providing temperature control (e.g., heating and/or cooling to temperatures between approximately 30° C. and 100° C.) and agitation (e.g., mixing and/or stirring) of the mixture to facilitate formation of the lead salt (e.g., lead citrate, lead acetate) precipitate in the leaching mixture 62. Accordingly, the leaching vessel 56 may produce (e.g., store, contain, or output) the leaching mixture 62, which includes the formed lead salt precipitate and the remainder of the lead-bearing material.

The system 40 illustrated in FIG. 2 includes a first separation device 64 that is configured to perform the acts described in block 18 of the process 10 illustrated in FIG. 1. In certain embodiments, the first separation device 64 may include a filter press, cyclone separator, a settling tank, a centrifuge, or any other device capable of separating portions of the leaching mixture 62 based on differences in specific density and/or particle size of the solids contained therein. That is, the first separation device 64 is configured to separate a portion 66 of the leaching mixture that includes particles having specific densities below a specific density threshold value, and/or particle sizes below a particle size threshold value, to be advanced to the growth vessel 68. In certain embodiments, the first separation device 64 may be configured to remove a portion of the leaching mixture 62 from the leaching vessel 56 based on specific density and/or size of the particles, leaving the higher specific density and/or larger impurity particles behind in the leaching vessel 56. In other embodiments, the separation device 64 may receive a flow of the leaching mixture 62 from the leaching vessel 56, and may separate the leaching mixture 62 such that the portion 66 of the leaching mixture 62 having a lower specific density particles and/or smaller particle sizes is advanced to the growth vessel 68, while the higher specific density and/or larger impurity particles may be returned to the leaching mixture 62 in the leaching vessel 56, or may advance to other purification techniques in accordance with the present disclosure. In certain embodiments, as discussed below with respect to FIG. 3, the first separation device 64 may not be present and, instead, the leaching vessel 56 itself may include one or more features that enable the leaching vessel 56 to selectively advance the portion 66 of the leaching mixture 62 to the growth vessel 68.

As such, the system 40 illustrated in FIG. 2 includes a growth vessel 68 that is configured to perform the acts described in block 20 of the process 10 illustrated in FIG. 1. The growth vessel 68 may be a reactor or a stage of a multi-stage reactor (e.g., a growth tank or reactor) that receives the portion 66 of the leaching mixture having particles with specific densities below the specific density threshold value, and/or particle below a particle size threshold value, to form a growth mixture 70. In certain embodiments, the growth vessel 68 may also add seed crystals 72 and/or acid (e.g., citric acid, acetic acid) or base (e.g., sodium carbonate, and/or sodium hydroxide) 74 to encourage growth and/or agglomeration of the lead salt particles. In certain embodiments, the growth vessel 68 may also be capable of both providing temperature control (e.g., heating and/or cooling) and agitation (e.g., mixing and/or stirring) of the mixture to facilitate growth and/or agglomeration of the lead salt particles within the growth mixture 70. Accordingly, the growth vessel 68 may produce (e.g., store, contain, or output) the growth mixture 70, which includes the lead salt particles.

The system 40 illustrated in FIG. 2 includes a second separation device 76 that is configured to perform the acts described in block 22 of the process 10 illustrated in FIG. 1. In certain embodiments, the second separation device 76 may include a filter press, a clarifier, a cyclone separator, a settling tank, a belt dryer, a spray dryer, or any other device capable of separating components of the growth mixture 70 based on phase, size, and/or mass. As such, in certain embodiments, the second separation device 76 receives a supply of the growth mixture 70 from the growth vessel and separates the lead salt particles 78 (e.g., enlarged lead salt particles 78) from a liquid component 80 of the growth mixture 70. In other embodiments, the second separation device 76 may continually, selectively remove lead salt particles 78 that are greater than a particular size or mass from the growth mixture 70, leaving the smaller lead salt particles in the growth mixture 70 to continue growth and/or agglomeration. It may be appreciated that, for certain separation devices, such as a filter press, the enlarged lead salt particles 78 are more efficiently separated from the liquid component 80 (e.g., less filter clogging, fewer lead salt particles pass through the filter). Subsequently, the isolated lead salt particles 78 may advance to the next device (e.g., lead salt precipitate treatment device 82) in the illustrated system 40 and eventually provide the leady oxide particles 84, as discussed below. The liquid component 80 isolated by the second separation device 76 may subsequently advance to other purification techniques, and may be recycled within the system 40 (e.g., within the leaching vessel 56 and/or the growth vessel 68) in accordance with the present disclosure.

The system 40 illustrated in FIG. 2 includes a lead salt precipitate treatment device 82 that is configured to perform the acts described in block 24 of the process 10 illustrated in FIG. 1. In certain embodiments, the lead salt precipitate treatment device 70 may include a reactor that mixes the lead salt particles 78 with base 86 (e.g., a hydroxide, 25-50 wt % sodium hydroxide solution) to yield the leady oxide product 74. In certain embodiments, the lead salt precipitate treatment device 82 may include a calciner (e.g., a belt dryer, a batch calciner, an oven, a spray calciner, a rotary kiln calciner, a spray pyrolysis reactor, a stirred pot reactor, or another suitable calcination device). As such, the lead salt precipitate treatment device 82 receives the lead salt particles 78 isolated by the second separation device 76 and reacts the particles with a gas stream (e.g., air, oxygen-enriched air, oxygen-reduced air, nitrogen/air mixtures, water steam) or base 86 (e.g., a hydroxide) to form leady oxide particles 84. For example, in certain embodiments, the lead salt precipitate treatment device 82 may calcine the lead salt particles 78 in a mixture of air and an oxygen-reducing agent (e.g., carbon based materials such as methane, coke, propane, natural gas, etc.) to provide an oxygen-poor, reducing environment to transform the lead salt particles 78 into the leady oxide particles 84. The leady oxide particles 84 may be used to form a leady oxide active material for the construction of new lead-acid batteries (e.g., as discussed in blocks 26 and 28 of the process 10 in FIG. 1). As mentioned above with respect to the process 10, the leady oxide produced by the illustrated system 40 enables the production of new lead-acid batteries having good to excellent electrical performance.

Figure 3:
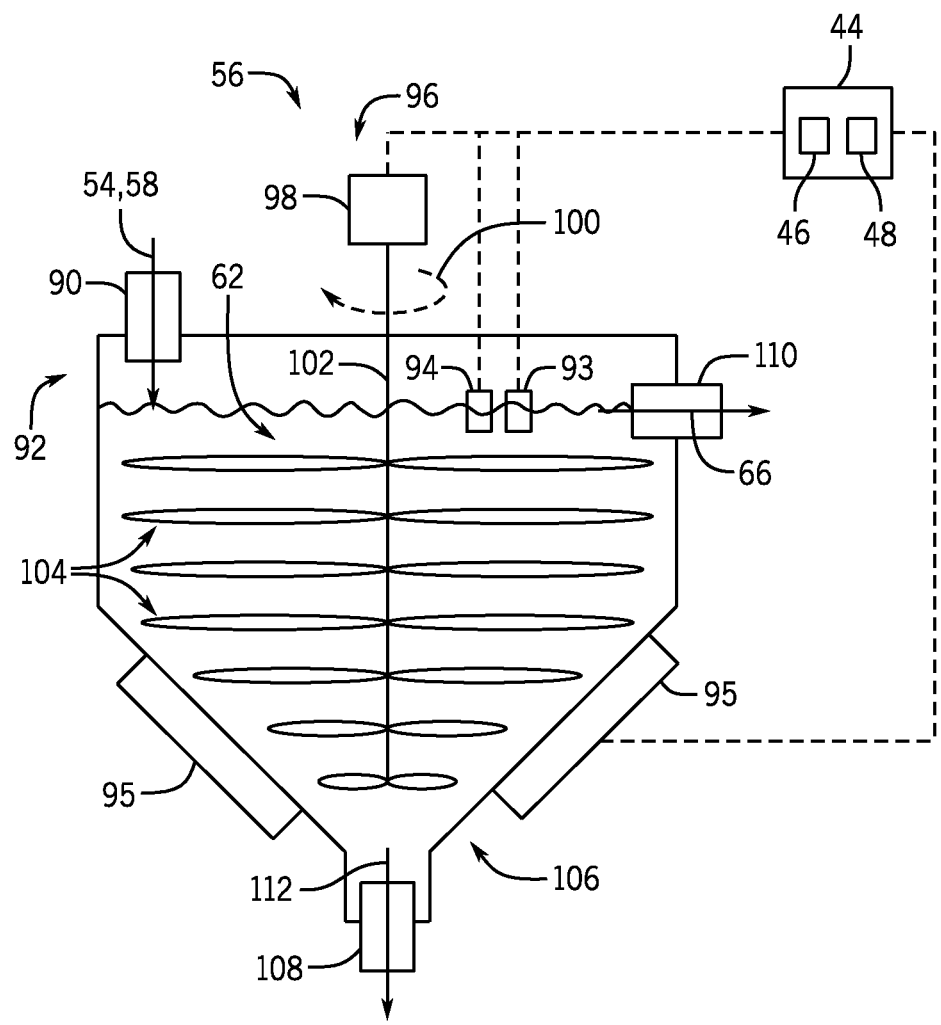
FIG. 3 is a schematic of an embodiment of a leaching vessel capable of selectively advancing a portion of a leaching mixture to a growth vessel.

As mentioned above, in certain embodiments, the first separation device 64 may not be present as a separate device and, instead, the leaching vessel 56 may include one or more features that enable the leaching vessel 56 to selectively advance the portion 66 of the leaching mixture 62 having particles with suitably low specific densities, and/or suitably small particle sizes, to the growth vessel 68. FIG. 3 illustrates a schematic of an example of a leaching vessel 56 that includes features to facilitate both the lead leaching process and the selective advancement of the portion 66 of the leaching mixture 62. For the example embodiment illustrated in FIG. 3, the leaching vessel 56 receives the lead-bearing material 54 and the carboxylate source 58 via a first orifice 90 positioned near the top 92 of the leaching vessel 56. As mentioned above, in certain embodiments, a peroxide, a hydroxide, and/or sodium carbonate may also be added to the leaching mixture 62 via the first orifice 90. In particular, based on pH measurements performed by the pH sensor 94 the controller 44 may determine whether or not additional acid (e.g., citric acid, acetic acid) or base (e.g., sodium hydroxide, sodium carbonate) should be added to maintain a desired pH range (e.g., between 1 and 7, between 3 and 6) and provide the appropriate control signals to provoke the addition (e.g., activate valves or pumps to facilitate desired flow levels of each ingredient). Similarly, as mentioned above, the illustrated controller 44 is communicatively coupled to one or more temperature sensors 93 and one or more temperature control elements 95 (e.g., heating elements 95) to provide suitable temperature control during leaching and separation. It may be appreciated that, while the illustrated leaching vessel 56 demonstrates the use of a single orifice 90 for the addition of all of the ingredients of the leaching mixture, this is merely one example. In other embodiments, each ingredient may be separately added to the leaching mixture 62 via a different respective orifice, or each ingredient may have a separate respective flow path to the leaching mixture 62 via a common orifice 90. Regardless, the controller 44 may provide control signals to actuate valves, activate pumps, and so forth, to facilitate desired flow levels of each ingredient to provide the desired leaching mixture 62.

The illustrated leaching vessel 56 also includes a stirring device 96 that is also controlled by the controller 44 (which may represent multiple separate controllers) to provide a suitable rate of stirring or agitation within the leaching vessel 56. The controller 44 may provide control signals to the drive mechanism 98 of the stirring device 96 to cause the drive mechanism 98 (e.g., a motor) to rotate 100 the shaft 102 and the attached blades 104 at an appropriate speed to stir and mix the leaching mixture 62. Further, for the illustrated embodiment, the speed of the rotation 100, in combination with the conically shaped bottom portion 106 of the leaching vessel, may also facilitate the separation of portions of the leaching mixture 62 based on density and/or particle size. For example, the speed of the rotation 100 and the shape of the conical bottom portion 106 may be tuned to enable the densest and/or largest particulates in the leaching mixture 62 to collect near a second, closable orifice 108 positioned at the bottom of the leaching vessel 56. Further, the speed of the rotation 100 and the shape of the conical bottom portion 106 may be tuned to enable less dense portion 66 of the leaching mixture 62 to collect or accumulate near the top 92 of the leaching vessel 56, near a third orifice 110 from which the less dense portion 66 may be extracted (e.g., pumped, overflow, spillover) from the leaching vessel 56. In other words, the illustrated leaching vessel 56 generally utilizes the settling effect at least partially reliant on gravity and on centrifugal force provided by the rotation 100 to enable a specific density-based and/or particle size-based separation of portions of the leaching mixture 62.

It may also be appreciated that, while present embodiments are directed toward separating lead salt particles from lead-bearing particles based on specific density and/or particle size, in certain embodiments, this may be achieved by separating the leaching mixture into different portions based on the density of each portion of the mixture (i.e., the leaching slurry). That is, the particles from a portion of the leaching mixture may be selectively advanced to the growth vessel, wherein the portion of the leaching mixture (including both liquids and solids) has an apparent density that is below a particular density threshold value. The apparent density ($dM$) of the portion of the leaching mixture slurry may be calculated according to the following equation:

$$1/dM = (xS/dS) + (1-xS)/dL,$$ Eq. 1 wherein dS is the density of the solid particles and dL is the density of the liquid component (e.g., slightly greater than 1). xS represents the concentration of the solids within the liquid and is computed as being equal to the weight of the solid particles in a certain volume of slurry mixture divided by the weight of that volume of the mixture. In an example, for a leaching reactor 56 illustrated in FIG. 3, the upper portion of the leaching mixture (which includes a substantial amount of the lead salt particles) may have an xS value of about 0.3, while the lower portion of the leaching mixture (which includes a substantial amount of lead-bearing material particles) may have an xS value of about 0.6 or 0.7 (assuming the volume of the solid in the mixture to be homogenous at approximately 20%). Accordingly, in this example, since the density of the liquid portion of the leaching mixture may be a little greater than 1.0 g/mL, the upper portion of the leaching mixture may have an apparent density of approximately 1.2 g/mL, while the lower portion of the leaching mixture may have an apparent density of approximately greater than or equal to approximately 2 g/mL or approximately 3 g/mL. As such, in certain embodiments, the particles in an upper portion 66 of the leaching mixture 62 may be advanced to the growth vessel, wherein the apparent density of the portion of the leaching mixture may be, for example, equal to 1 g/mL, less than or equal to 1.05 g/mL, less than or equal to 1.1 g/mL, less than or equal to 1.5 g/mL, less than or equal to 2 g/mL, less than or equal to 2.5 g/mL, or less than or equal to 3 g/mL. In certain embodiments, the particles in a portion of the leaching mixture may be advanced to the growth vessel, and the apparent density of the remaining portion of the leaching mixture may be greater than 1.05 g/mL, greater than 1.1 g/mL, greater than 1.5 g/mL, greater than 2 g/mL, greater than 2.5 g/mL, or greater than 3 g/mL.

For example, as illustrated in FIG. 3, in an embodiment, the lead-bearing material 54, the carboxylate source 58, and any other suitable chemicals components may be added, continually or intermittently, to the leaching mixture 62 via the first orifice 90. Accordingly, in this embodiment, the less dense portion 66 of the leaching mixture 62 (which includes mostly or entirely lead salt particles) may be removed, continually or intermittently, from the top of the leaching mixture 62 via the third orifice 110. In certain embodiments, the portion 66 may be actively removed (e.g., pumped) from the top of the leaching mixture 62, while in other embodiments, the portion 66 may passively overflow or spillover from the third orifice 110 of the leaching vessel 56. Further, in this embodiment, the denser portion 112 of the leaching mixture (which includes mostly or entirely lead-bearing particles) may be removed, continually or intermittently, from the bottom of the leaching mixture 62 via the second orifice 108 and advanced to other purification techniques in accordance with the present disclosure. In certain embodiments involving intermittent removal of the less dense portion 66 and/or the denser portion 112 of the leaching mixture 62, the stirring device 96 may be temporarily slowed or stopped for a period of time (e.g., settling time) before the less dense portion 66 and/or the denser portion 112 of the leaching mixture 62 are removed.

One or more of the disclosed embodiments, alone or on combination, may provide one or more technical effects useful in the recovery and purification of lead from spent lead-acid batteries. Embodiments of the present approach enable the industrial scale extraction and purification of the lead content from spent lead-acid batteries. Further, present embodiments enable the removal of several impurities (e.g., insoluble impurities, sulfates, alloying metals) from the recovered lead, thereby avoiding or reducing the formation of certain undesired combustion byproducts as well as the cost associated with scrubbing these byproducts from the exhaust stream. Accordingly, present embodiments enable continuous lead purification techniques that are robust to the presence of a wide variety of impurities and provide enhanced control over the parameters of the purification process. Moreover, present embodiments limit or reduce the amount of impurities that are entrained with the lead salt particles and proceed to treatment by enabling the selective advancement of the lead salt precipitate, based on specific densities and/or particle size of the lead salt particles, to a separate growth vessel during the lead recovery and purification process. Additionally, present embodiments utilize separate leaching and growth vessels, which enables separate and improved control over both leaching conditions and growth conditions. Further, the disclosed growth vessel enables the production of enlarged lead salt particles that may be more easily and/or more efficiently isolated from the liquid component of the growth mixture. The technical effects and technical problems in the specification are exemplary and are not limiting. It should be noted that the embodiments described in the specification may have other technical effects and can solve other technical problems.

While only certain features and embodiments of the disclosure have been illustrated and described, many modifications and changes may occur to those skilled in the art (e.g., variations in sizes, dimensions, structures, shapes and proportions of the various elements, values of parameters (e.g., temperatures, pressures), mounting arrangements, use of materials, colors, orientations) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:
1. A method, comprising:
   forming a first mixture in a first vessel, wherein the first mixture comprises a lead-bearing material and a carboxylate source that react to precipitate lead carboxylate particles;
   selectively isolating a portion of the first mixture from a remainder of the first mixture, wherein the portion mostly includes lead carboxylate particles having specific densities below a specific density threshold value and having particle sizes below a particle size threshold value;
   forming a second mixture in a second vessel, wherein the second mixture comprises the lead carboxylate particles from the portion of the first mixture; and separating the lead carboxylate particles of the second mixture from a liquid component of the second mixture.

2. The method of claim 1, wherein the second mixture grows and/or agglomerates the lead carboxylate particles into larger lead carboxylate particles.

3. The method of claim 1, wherein the specific density threshold value is less than 6 grams per milliliter (g/mL).

4. The method of claim 1, wherein the specific density threshold value is less than 5 g/mL.

5. The method of claim 1, wherein the specific density threshold value is less than 4 g/mL.

6. The method of claim 1, wherein the specific density threshold value is less than 3 g/mL.

7. The method of claim 1, wherein separating the lead carboxylate particles of the second mixture from the liquid component of the second mixture comprises using a belt dryer, a filter press, a clarifier, a settling tank, a cyclone separator, or a combination thereof.

8. The method of claim 1, comprising treating the lead carboxylate particles separated from the second mixture to yield leady oxide using a belt dryer, a spray calciner, a stirred pot reactor, a rotary kiln calciner, or a combination thereof.

9. The method of claim 1, comprising treating the lead carboxylate particles separated from the second mixture with a hydroxide to yield leady oxide.

10. The method of claim 1, wherein the carboxylate source comprises citric acid, a salt of citric acid, or a combination thereof.

11. The method of claim 1, wherein the particle size threshold value is between 1 micrometers ($\mu$m) and 20 $\mu$m.

12. The method of claim 1, wherein the first mixture comprises a peroxide, a hydroxide, sodium carbonate, or a combination thereof.

13. The method of claim 1, wherein the second mixture comprises seed crystals, acid, base, or a combination thereof.

14. The method of claim 1, wherein the selectively isolating the portion of the first mixture comprises using a filter press, a clarifier, a settling tank, a cyclone separator, a centrifuge, or a combination thereof.

15. A method, comprising:
forming a first mixture in a first vessel, wherein the first mixture comprises a carboxylate source and particles, wherein the particles comprise lead-bearing particles and lead carboxylate particles, wherein the lead carboxylate particles are generated as a product of reactions between the lead-bearing particles and the carboxylate source in the first mixture;
selectively isolating a portion of the particles from the first mixture based at least in part on the portion having particle sizes below a particle size threshold value, wherein the portion mostly includes lead carboxylate particles; and
treating the portion of the particles to yield leady oxide.

16. The method of claim 15, wherein the carboxylate source comprises citric acid, a salt of citric acid, or a combination thereof.

17. The method of claim 15, wherein the particle size threshold value is between 1 $\mu$m and 20 $\mu$m.

18. The method of claim 17, wherein the particle size threshold value is less than 10 $\mu$m.

19. The method of claim 15, wherein selectively isolating further comprises selectively isolating the portion of the particles from the first mixture also based at least in part on the portion having specific densities below a specific density threshold value.

20. The method of claim 19, wherein the specific density threshold value is less than 6 g/mL.

21. A method, comprising:
forming a first mixture in a first vessel, wherein the first mixture comprises a carboxylate source and particles, wherein the particles comprise lead-bearing particles and lead carboxylate particles, wherein the lead carboxylate particles are generated as a product of reactions between the lead-bearing particles and the carboxylate source in the first mixture;
selectively isolating a portion of the particles from the first mixture based at least in part on the portion of the particles having specific densities below a specific density threshold value, wherein the portion mostly includes lead carboxylate particles; and
treating the isolated lead carboxylate particles to yield leady oxide.

22. The method of claim 21, wherein the carboxylate source comprises citric acid, a salt of citric acid, or a combination thereof.

23. The method of claim 21, wherein the specific density threshold value is less than 6 g/mL.

24. The method of claim 23, wherein the specific density threshold value is between approximately 4 g/mL and approximately 4.5 g/mL.

25. The method of claim 23, wherein the specific density threshold value is between approximately 2 g/mL and approximately 2.5 g/mL.

26. The method of claim 23, wherein selectively isolating comprises selectively isolating the portion of the particles from the first mixture based at least in part on the portion having particle sizes below a particle size threshold value, and wherein the particle size threshold value is between 1 $\mu$m and 20 $\mu$m.

27. The method of claim 26, wherein the particle size threshold value is less than 10 $\mu$m.

28. The method of claim 27, wherein the particle size threshold value is less than 5 $\mu$m.

29. The method of claim 21, wherein selectively isolating comprises using a clarifier, a settling tank, a cyclone separator, a centrifuge, or a combination thereof.

* * * * *

UNITED STATES PATENT AND TRADEMARK OFFICE
CERTIFICATE OF CORRECTION

| | | |
|---|---|---|
| PATENT NO. | : 9,533,273 B2 | Page 1 of 1 |
| APPLICATION NO. | : 14/498839 | |
| DATED | : January 3, 2017 | |
| INVENTOR(S) | : Meissner, Jr. et al. | |

It is certified that error appears in the above-identified patent and that said Letters Patent is hereby corrected as shown below:

On the Title Page
1. In Item (12), under "United States Patent", in Column 1, Line 1, delete "Meissner et al." and insert -- Jr., Meissner et al. --, therefor.

2. In Item (72), under "Inventors", in Column 1, Line 2, delete "Eberhard Meissner," and insert -- Eberhard Meissner Jr., --, therefor.

3. In Item (73), under "Assignee", in Column 1, Line 1, delete "Johnson Controls Technology Company, Holland, MI (US)," and insert -- JOHNSON CONTROLS AUTOBATTERIE GMBH & CO. KGAA, Hannover (DE) --, therefor.

4. In Item (56), under "U.S. PATENT DOCUMENTS", in Column 1, Line 2, delete "Kolakowski" and insert -- Striffler, Jr., et al. --, therefor.

5. On Page 2, in Item (56), under "U.S. PATENT DOCUMENTS", in Column 1, Line 30, delete "Kumar" and insert -- Kumar, et al. --, therefor.

In the Specification
6. In Column 3, Line 35, delete "tartarate," and insert -- tartrate, --, therefor.

7. In Column 9, Line 54, delete "lead salt precipitation device 56" and insert -- leaching vessel 56 --, therefor.

8. In Column 11, Lines 21-22, delete "lead salt precipitate treatment device 70" and insert -- lead salt precipitate treatment device 82 --, therefor.

9. In Column 11, Lines 24-25, delete "leady oxide product 74." and insert -- leady oxide product 84. --, therefor.

Signed and Sealed this
Twenty-third Day of May, 2017

Michelle K. Lee
*Director of the United States Patent and Trademark Office*